US011153769B2

(12) United States Patent
Abouelmaati

(10) Patent No.: US 11,153,769 B2
(45) Date of Patent: Oct. 19, 2021

(54) NETWORK FAULT DISCOVERY

(71) Applicant: British Telecommunications Public Limited Company, London (GB)

(72) Inventor: Dalia Abouelmaati, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/500,589

(22) PCT Filed: Jan. 30, 2018

(86) PCT No.: PCT/EP2018/052281
§ 371 (c)(1),
(2) Date: Oct. 3, 2019

(87) PCT Pub. No.: WO2018/184748
PCT Pub. Date: Oct. 11, 2018

(65) Prior Publication Data
US 2020/0196172 A1 Jun. 18, 2020

(30) Foreign Application Priority Data
Apr. 3, 2017 (EP) .................................. 17164621

(51) Int. Cl.
H04W 24/08 (2009.01)
H04B 17/00 (2015.01)
H04L 12/24 (2006.01)
H04W 88/08 (2009.01)

(52) U.S. Cl.
CPC ........ H04W 24/08 (2013.01); H04B 17/0085 (2013.01); H04L 41/0695 (2013.01); H04W 88/08 (2013.01)

(58) Field of Classification Search
CPC ...................... H04L 41/0695; H04B 17/0085
See application file for complete search history.

(56) References Cited

U.S. PATENT DOCUMENTS 10,420,024 B2   9/2019  Abouelmaati
2004/0106408 A1 6/2004  Beasley et al.
(Continued)

FOREIGN PATENT DOCUMENTS

CN  101583150    11/2009
EP  2154918 A1   2/2010
(Continued)

OTHER PUBLICATIONS

Combination Search and Examination Report, Application No. GB1705353.9, dated Aug. 29, 2017, 5 pages.
(Continued)

Primary Examiner — Jamaal Henson
(74) Attorney, Agent, or Firm — Patterson Thuente Pedersen, P.A.

(57) ABSTRACT

Network addresses which are frequently accessed by user terminals are monitored by a network access point to which the terminals are connected, and the network access point then makes attempts to access the network addresses from time to time and makes reports to a network management system of any such network addresses that fail to respond. This increases the likelihood of detection and reporting of failures of active addresses before the user has need of them.

15 Claims, 4 Drawing Sheets

(56) References Cited

U.S. PATENT DOCUMENTS

| | | | |
|---|---|---|---|
| 2004/0243349 A1* | 12/2004 | Greifeneder | H04L 63/0428 |
| | | | 702/183 |
| 2009/0013210 A1 | 1/2009 | McIntosh | |
| 2009/0117852 A1 | 5/2009 | Loh | |
| 2009/0161556 A1 | 6/2009 | Qian | |
| 2009/0164625 A1 | 6/2009 | Roll | |
| 2010/0208621 A1 | 8/2010 | Morper | |
| 2011/0208992 A1 | 8/2011 | Cohen et al. | |
| 2013/0215768 A1 | 8/2013 | Meloche | |
| 2013/0322234 A1 | 12/2013 | Mohseni | |
| 2015/0009901 A1 | 1/2015 | Chandra | |
| 2015/0019713 A1* | 1/2015 | Bugenhagen | H04L 43/10 |
| | | | 709/224 |
| 2015/0058481 A1 | 2/2015 | Miller et al. | |
| 2015/0327062 A1 | 11/2015 | Tatavarty | |
| 2016/0218942 A1* | 7/2016 | Choquette | H04L 67/02 |
| 2016/0360430 A1* | 12/2016 | Stevens | H04W 76/30 |
| 2017/0257810 A1 | 9/2017 | Gandhi | |
| 2017/0353371 A1* | 12/2017 | Wu | H04L 43/0852 |
| 2019/0246329 A1 | 8/2019 | Abouelmaati et al. | |

FOREIGN PATENT DOCUMENTS

| | | |
|---|---|---|
| EP | 2230864 A1 | 9/2010 |
| EP | 2693810 A1 | 2/2014 |
| EP | 2770772 A1 | 8/2014 |
| EP | 2797354 A1 | 10/2014 |
| EP | 2800425 A1 | 11/2014 |
| WO | WO-2008030171 A2 | 3/2008 |
| WO | WO-2015079195 | 6/2015 |
| WO | WO-2015160296 A1 | 10/2015 |
| WO | WO-2016118899 | 7/2016 |
| WO | WO-2017162399 A1 | 9/2017 |
| WO | WO-2017162400 A1 | 9/2017 |

OTHER PUBLICATIONS

International Search Report and Written Opinion, Application No. PCT/EP2018/052281, dated Apr. 5, 2018, 15 pages.
International Preliminary Report on Patentability, Application No. PCT/EP2018/052281, dated Mar. 18, 2019, 14 pages.
Extended European Search Report, Application No. 17164621.9, dated Sep. 14, 2017, 10 pages.
3GPP TSG-RAN WG3 #75, "Potential solutions for self-healing," Huawei, Feb. 6-10, 2012, Agenda Item: 11.2, R3-120128, Dresden, Germany, 3 pages.
3GPP TSG-RAN WG3 Meeting #74, "Clarification for Self-healing at RAN," Huawei, Nov. 14-18, 2011, Telefonica, Orange, Agenda Item: 11.6, R3-112773, San Francisco, US, 3 pages.
Abouelmaati D., et al., "Femtocell Collaborative Outage Detection (FCOD) with Built-in Sleeping Mode Recovery (SMR) Technique," Oct. 24, 2015, vol. 156, pp. 477-486.
Combined Search and Examination Report for GB Application No. GB1604866.2 dated Sep. 13, 2016, 6 pages.
Examination Report for GB Application No. GB1618269.3 dated Mar. 16, 2017, 5 pages.
Examination Report under section 18(3) for GB Application No. GB1604866.2, dated May 8, 2018, 4 pages.
Extended European Search Report, Application No. 16196346.7, dated Feb. 27, 2017, 14 pages.
International Preliminary Report on Patentability for Application No. PCT/EP2017/054309, dated Sep. 25, 2018, 8 pages.
International Preliminary Report on Patentability for Application No. PCT/EP2017/054312, dated May 15, 2018, 10 pages.
International Preliminary Report on Patentability for Application No. PCT/EP2017/075237, dated Oct. 4, 2018, 18 pages.
International Search Report and Written Opinion for Application No. PCT/EP2017/054309, dated May 12, 2017, 11 pages.
International Search Report and Written Opinion for Application No. PCT/EP2017/054312, dated Apr. 7, 2017, 10 pages.
International Search Report and Written Opinion for Application No. PCT/EP2017/075237, dated Jan. 18, 2018, 16 pages.
Wang et al., "Cooperative Cell Outage Detection in Self-Organizing Femtocell Networks," INFOCOM, 2013 proceedings IEEE, retrieved from http://www.cse.ust.hk/~gswwang/Wei_files/papers/infocom13_cod.pdf, on Dec. 3, 2018, Apr. 14, 2013, 9 pages.
Application and Filing Receipt for U.S. Appl. No. 16/343,842, filed Apr. 22, 2019, Inventor: Abouelmaati.
Application and Filing receipt of U.S. Appl. No. 16/085,765, filed Sep. 17, 2018, Inventor(s): Abouelmaati.
Application and Filing Receipt for U.S. Appl. No. 16/085,781, filed Sep. 17, 2018, Inventor(s): Abouelmaati.
Communication pursuant to Article 94(3) EPC for European Application No. 18702487.2, dated Oct. 26, 2020, 5 pages.

* cited by examiner

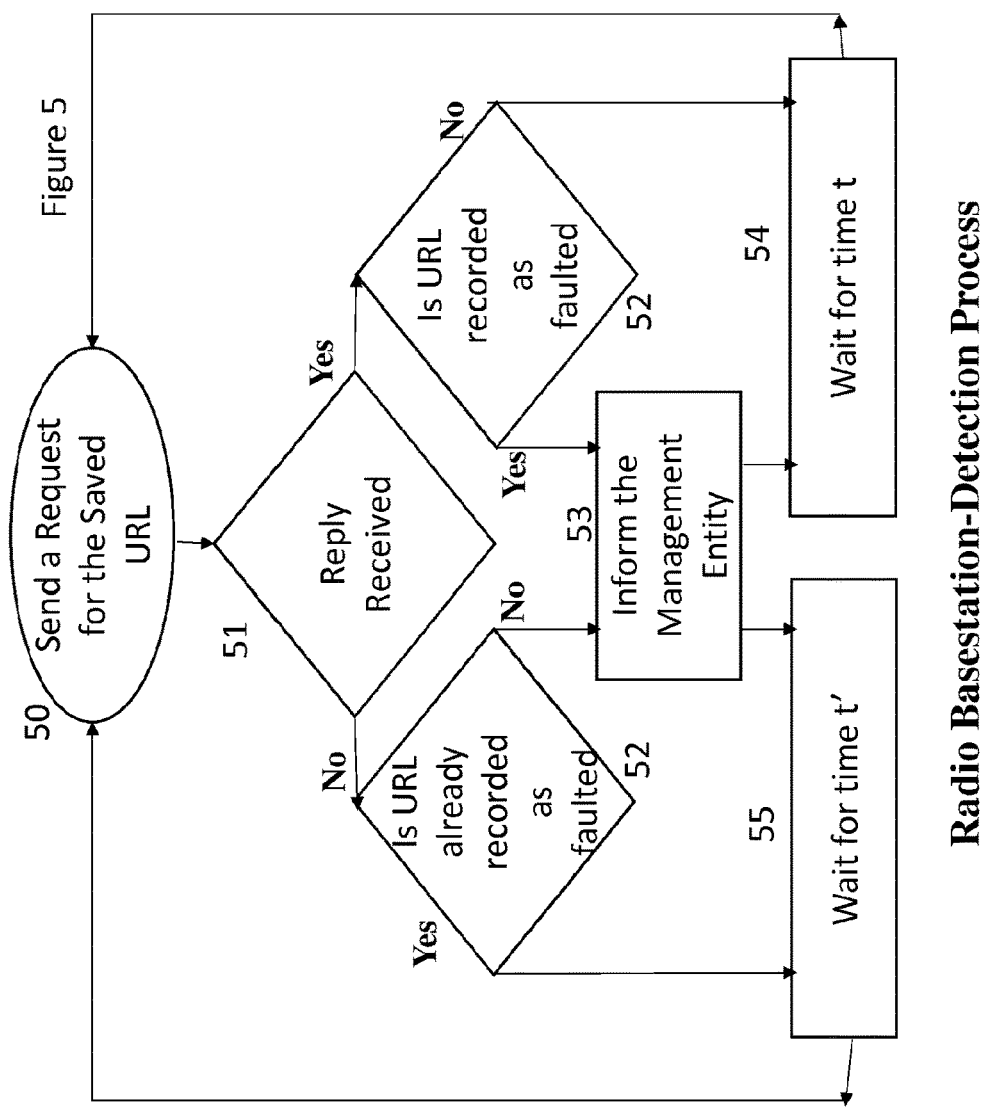
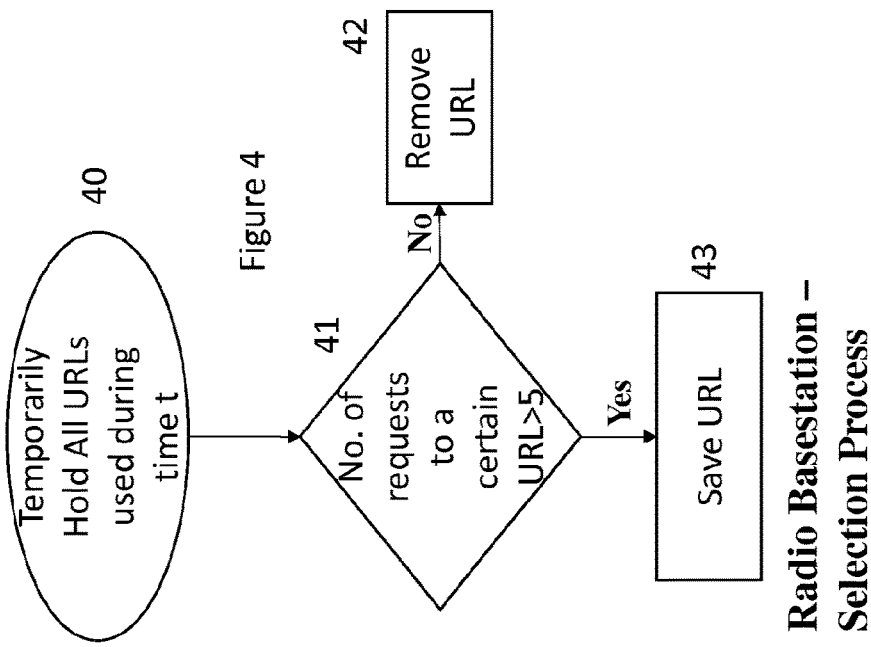

NETWORK FAULT DISCOVERY

PRIORITY CLAIM

The present application is a National Phase entry of PCT Application No. PCT/EP2018/052281, filed Jan. 30, 2018, which claims priority from European Patent Application No. 17164621.9, filed Apr. 3, 2017, each of which is hereby fully incorporated herein by reference.

TECHNICAL FIELD

The disclosure relates to monitoring of a network to identify outages of resources associated with network addresses.

BACKGROUND

It is known to monitor individual network addresses to detect outages, as described for example in WO2016/118899, US2013/0322234, US2011/0208992, and US20090164625. WO2015/079195 describes a method of monitoring a data communications network to identify outages of resources associated with a network address by recording access attempts to the network address made by user terminals through an access point, for which successful access attempts have been recorded in a predetermined period.

In these examples, addresses are monitored periodically by network gateways to identify any which are failing to respond, indicating a possible failure of the server at that address or the communications links connecting it to the rest of the network. However, this involves an additional communications overhead in transmitting the test messages and responses. Moreover, it does not take account of how significant such a failure may be, as the failed address may relate to a server which has fallen into disuse and is rarely accessed by access requests from real users, as distinct from the test messages.

It is therefore desirable to concentrate the test overhead on elements of the network on which a fault is more likely to affect the end-users.

Individual user terminals could report access failures, but this would only identify problems retrospectively, and only when a user terminal is connected and a request for access is made. It is desirable to identify outages of resources before those resources are requested, so that they can be remedied before the resource is required.

SUMMARY

According to the disclosure, there is provided a method of monitoring a data communications network to identify outages of resources associated with network addresses by recording, at an access point, access attempts to target network addresses for which successful access attempts made by user terminals through the access point over the data communications network have been recorded in a predetermined period, wherein test attempt requests are generated, and the test attempt requests are transmitted to a plurality of target network addresses, and any such network addresses that fail to respond are reported to a network management system.

In some embodiments, the network management system is responsive to multiple failure reports from different access points relating to the same network address by recording occurrence of a potential fault condition associated with the network address. It may also be responsive to multiple failures of access attempts from a given access point by recording occurrence of a potential fault condition associated with the access point.

In one embodiment, access attempts by user terminals to each address are counted during a predetermined period, and the access point attempts access periodically to addresses which have been recorded as having been accessed through the access point more than a predetermined number of times. Access attempts may be made at different times of day, in order to identify failure modes which have a diurnal pattern, for example because of overloads at times of peak demand.

Following a first access attempt, the intervals between subsequent access attempts may be selected according to whether the first access attempt fails or succeeds.

To minimize communication overhead, alerts may be transmitted to the remote management system only if a response received by the response monitor in response to a test access request to a network address is different from a preceding response received by the response monitor in response to a previous test access request to the same network address.

Embodiments of the disclosure also provide an access point for connecting one or more user terminals to a data communications network, a test generation processor for generating test access requests for transmission over the data communications network, a response monitor for detecting responses to the test messages received from the target addresses through the data communications network, and an alerting processor for generating reports of failed responses, for transmission to a remote management system, characterised by an access request monitor for detecting and recording access requests made by user terminals connected to the access point to target network addresses, being addresses for which successful access attempts have been recorded in a predetermined period, the test generation processor being arranged to generate test messages for transmission to the target addresses Embodiments of the disclosure make use of individual user's network access points to monitor network addresses in regular use. Each access point records network addresses regularly accessed from the access point, and periodically checks those addresses to see if they are still active. If any fail to respond, this is reported to a network management entity which co-ordinates the data to allow collection of data from multiple access points which can be used to identify problems (e.g., denial of service attacks, system outages etc.). This allows the network operator to identify potential problems before the customer is inconvenienced by them. Thus a distributed mechanism can be provided for monitoring access requests, which will only notify the network if needed, preventing the overload of the network.

Reporting access request history only when an individual access point detects a problem reduces network overhead and allows monitoring to be concentrated on websites that are attracting the most interest, as compared with others that are dormant. It can also identify if an access problem is specific to an individual website/access point pair.

The co-ordination of data at network level also allows problems specific to an individual access point to be identified—in particular if access requests from an individual access point to multiple addresses are resulting in errors, this may be indicative of a problem with the backhaul connection to that access point, or with a user terminal connected to that access point, rather than with the addresses to which the requests are directed.

Another benefit is that with the huge increase of network access devices, it is more feasible to check only the most frequently-used websites rather than checking everything all the time, thereby lessening the communication overhead.

BRIEF DESCRIPTION OF THE DRAWINGS

Embodiments of the disclosure will now be described, by way of example, with reference to the drawings, in which:

FIG. 4 depicts a first stage in a process according to the disclosure.

FIG. 5 depicts a second stage in a process according to the disclosure.

DETAILED DESCRIPTION OF THE DRAWINGS

Figure 1:
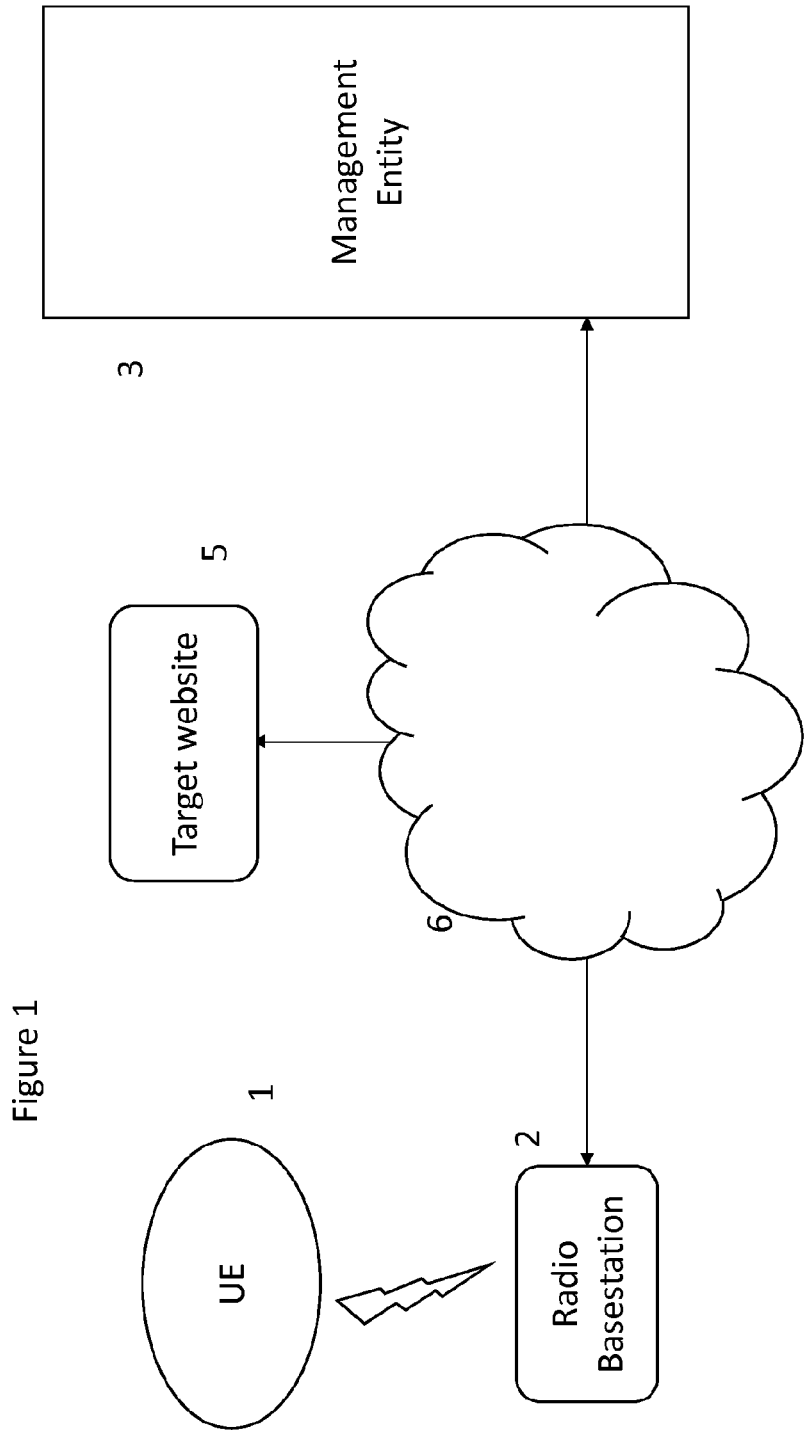
FIG. 1 depicts the network entities which co-operate to perform embodiments of the disclosure.

FIG. 1 depicts in schematic form a simplified network 6 connected to a network management system 3, an access point 2 and a target website server 5. A user terminal 1 can connect to the network 6 through the access point 2, and thereby communicate with the target website 5 and the management system 3. It will be recognized that in any practical system there will be many access points 2 and website servers 5 interconnected through the network 6, and each access point 2 may be connected to multiple user terminals 1.

Figure 2:
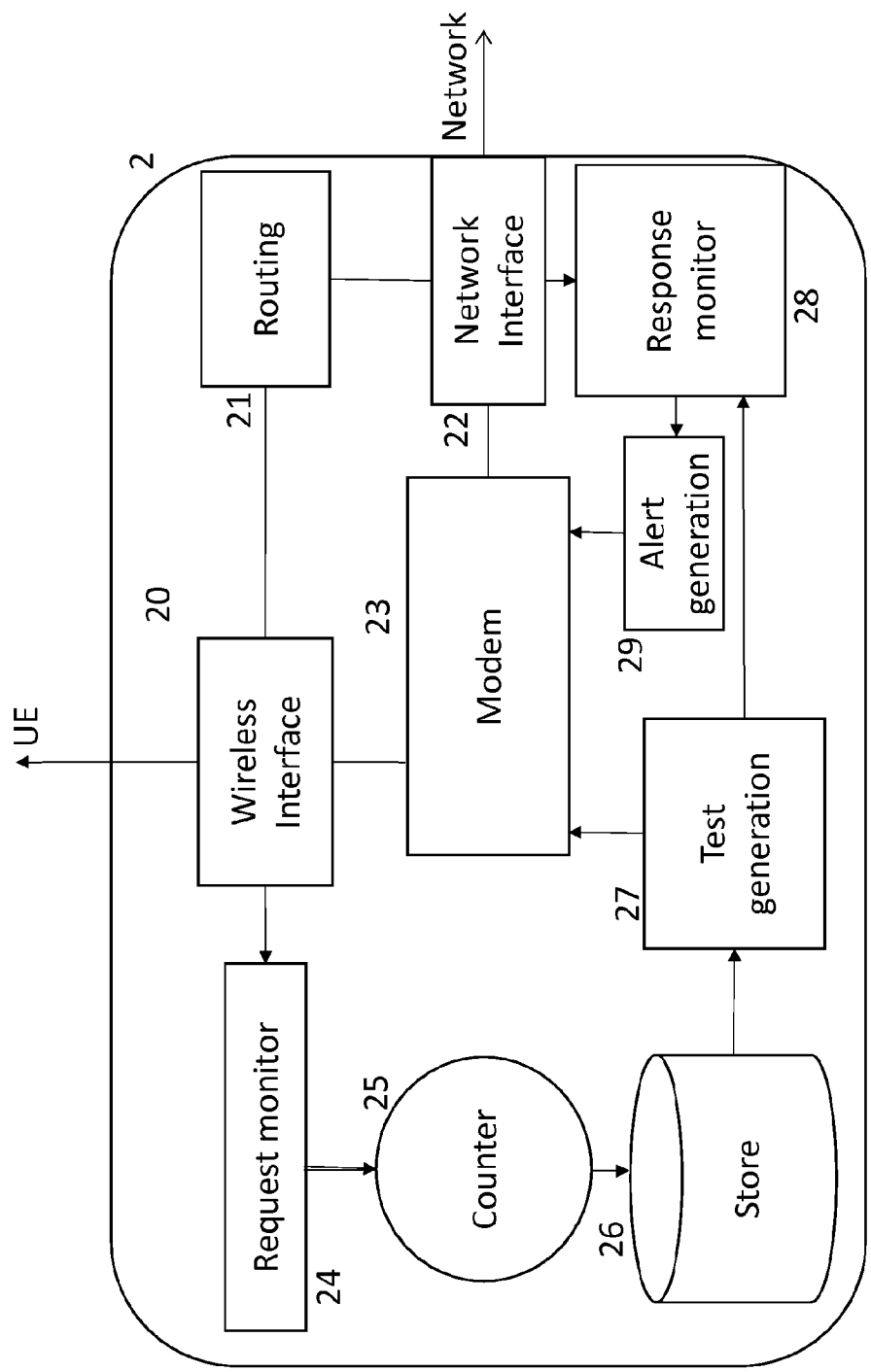
FIG. 2 depicts a wireless access point configured to operate according to the disclosure.

The access point 2 may be a domestic wireless router, femtocell or enterprise femtocell connected wirelessly to the user terminal 1, or they may have a wired connection (e.g., Ethernet). A wireless access point is depicted schematically in more detail in FIG. 2. The functional elements depicted in FIG. 2 are typically embodied in software or firmware. The access point 2 has a wireless interface 20 for communication with user terminals 1, and a network interface 22 for connection to a data communications network 6 such as the Internet. Data packets are translated from one medium to the other by a modem 23 and routing processes such as reading and writing address packets are is controlled by a routing function 21.

In addition to these conventional functions, the access point operates a number of additional functions in accordance with an embodiment of the disclosure. A monitoring system 24 intercepts access requests generated by user terminals connected by the access point, and stores a record of such requests in a memory store 26. A counter 25 is used to determine the number of access requests made to each individual address, and this is used to update the store.

A test generation system 27 is arranged to transmit access requests periodically to the addresses stored in the data store, by way of the modem 23 and network interface 22. A response monitor system 28 intercepts responses to these access requests, and controls an alert generation system 29 which is configured to process messages received over the network interface 22 in response to such requests by transmitting reports by way of the modem 23 and network 6 to the management entity 3.

Figure 3:
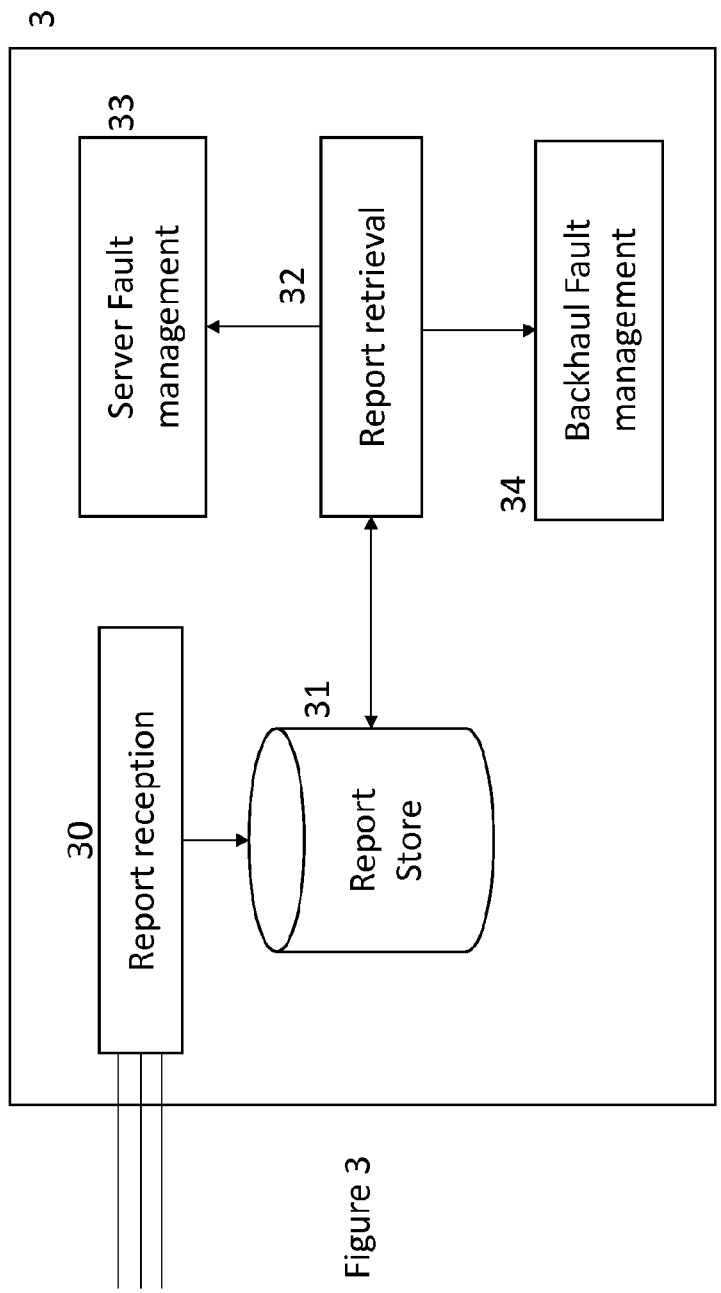
FIG. 3 depicts a network management entity configured to operate according to the disclosure.

FIG. 3 depicts a network management entity 3, which may be embodied in software, which co-operates with a number of access points 2 of the kind depicted in FIG. 2. The functional elements include a report reception function 30 which is configured to receive reports from the various access points about possible outages of network based server platforms such as the one depicted at 5 in FIG. 1. Such reports are stored in a database 31 for retrieval by a retrieval unit 32 which analyses the reports to identify patterns in the failure reports which may indicate a fault with a server 5 or with a user terminal 1, and reports to an appropriate fault management system 33, 34 accordingly.

The process by which the wireless access point 2 operates is depicted in FIG. 4 and FIG. 5, which illustrate two stages in the process. FIG. 4 depicts a method for selecting which network addresses are to be monitored, and FIG. 5 depicts the actual monitoring process. It should be noted that these processes can run concurrently, and in particular, the list of addresses to be monitored is continuously updated.

As shown in FIG. 4, the request monitor unit 24 in wireless access point 2 detects access requests made by the users and records a list of URLs (Internet Protocol addresses) that are regularly used by the customer. To do this it first stores the address identities in a temporary counting store 25 (at 40). At each such successful access attempt, a comparison is made with addresses already in the store 25 (at 41) and any address which occurs more than a predetermined number of times within a specified period t (for example five times in seven days) is forwarded to the main memory store 26. Each successful access attempt is removed from the temporary store (at 42) once the time window t has expired for that access attempt.

Addresses may be removed from the permanent store 26 if they have not been accessed for a longer predetermined period.

As shown in FIG. 5, the test generation system 27 identifies the addresses currently in the store 26 and tests each one from time to time to determine if they are still active, by sending an access request to each one (at 50) by way of the modem 23 and network interface 22. It can be that this is done when traffic is otherwise quiet, but it may be desirable to make successive tests on a particular website at different times of day as there may be a diurnal pattern of availability of certain websites which would not be detected if the test were made at the same time each day. The requests are flagged with an address corresponding to the response monitor unit 28 so that the responses are not forwarded to any of the user terminals.

The response monitor unit 28 is alerted to the requests and responds accordingly when a response is received, according to the process depicted in FIG. 5. If any of these URLs 5 is not responding, or responds with an error message (at 51) a report is generated by the alert generation unit 29 and sent by way of the modem 23, network interface 22, and Internet 6, to the management entity 3. The input 30 of the management entity 3 receives reports from multiple access and stores them in a store 31 for analysis. The reports are analyzed in a retrieval unit 32. If several access points report a failure of the same target network address 5, this is flagged as a potential fault with the target address and reported to a server fault management system 33, for example as a possible denial of service (DNS) issue. However, if more than one, or all of the target addresses tested by an individual access point are not responding, the report analyzer 32 may identify this as a potential problem with the access point, for example with its security settings or backhaul connection, and report to the backhaul fault management system 34. (It will be appreciated that only faults short of complete failure of the backhaul connection would be able to be reported in this way.)

The management entity 3 can process such reports to identify clusters or patterns to help identifying the cause of the issue. This allows the network operator to be more proactive, knowing about the issue and fixing it even before the customer notices. As the access point reports potential faults, fault detection can be determined even if no user terminal is currently connected to the access point, so that the problem can be reported to the network management system 3 before the user needs to use the address.

The response monitor system 28 stores the status of the URL, and when the next check is performed by the test generation system 27 the response is again analyzed by the monitor unit. After a certain time t (at 54, 55) the test generation system performs another check. The process depicted in FIG. 5 is arranged such that a change of status is reported to the management entity 3. If the address it is still returning a fault report (at 52) it does not inform the Management entity 3 again, but if it is has returned to activity the management entity is informed (at 53), so that the Management entity stops taking any further actions.

The interval t' between tests may be shorter when a URL is on record as faulty (at 55) than the time t when it is operating normally (at 54), so that updates are received more frequently.

The invention claimed is:

1. A method of monitoring a data communications network to identify outages of resources associated with network addresses comprising:
  recording, at each of one or more access points, respective access attempts to network addresses for which successful access attempts made by user terminals through the access point over the data communications network have been recorded in a predetermined period;
  transmitting test attempt requests generated by each of the one or more access points to a plurality of target network addresses, the plurality of target network addresses being addresses for which successful access attempts made by user terminals were recorded; and
  reporting any such network addresses that fail to respond to a network management system.

2. The method according to claim 1, further comprising recording occurrence of a potential fault condition associated with the network address in response to multiple failure reports from different access points relating to the same network address.

3. The method according to claim 1, further comprising recording occurrence of a potential fault condition associated with the one or more access points in response to multiple failures of access attempts from a given access point.

4. The method according to claim 1, further comprising:
  counting access attempts by user terminals to each address during a predetermined period, and
  periodically attempting access by the one or more access points to addresses which have been recorded as having been accessed through the one or more access points more than a predetermined number of times.

5. The method according to claim 1, wherein access attempts are made at different times of day.

6. The method according to claim 1, further comprising, following a first access attempt, making a subsequent access attempt after an interval which is selected according to whether the first access attempt fails or succeeds.

7. The method according to claim 1, further comprising transmitting an alert to the network management system only if a response received by the response monitor in response to a test access request to a network address is different from a preceding response received by a response monitor in response to a previous test access request to the same network address.

8. An access point for connecting one or more user terminals to a data communications network, comprising:
  a test generation processor for generating test access requests for transmission over the data communications network to target network addresses;
  a response monitor for detecting responses to the test messages received from the target network addresses through the data communications network;
  an alerting processor for generating reports of failed responses, for transmission to a remote management system; and
  an access request monitor for detecting and recording access requests made by user terminals connected to the access point to target network addresses, being addresses for which successful access attempts have been recorded in a predetermined period,
  wherein the test generation processor is arranged to generate test messages for transmission to the target addresses.

9. The access point according to claim 8, further comprising a counter for counting access attempts to a network address, and for controlling the test generation processor to generate access requests in response to the counter identifying a predetermined number of requests in a predetermined time.

10. The access point according to claim 8, wherein the test generation processor is configured to generate test access requests at staggered times of day.

11. The access point according to claim 8 wherein the test generation processor is controlled by the response monitor to generate test access requests to a target network address at a first interval if the response monitor records a successful response to the previous request, and at a second, shorter interval if the response monitor records a failed response to the previous request.

12. The access point according to claim 8 wherein the alerting processor is configured to transmit an alert to the remote management system only if a response received by the response monitor in response to a test access request to a target network address is different from a preceding response received by the response monitor in response to a previous test access request to the same network address.

13. A method for remote configuration of a programmable device associated with an access point comprising transmitting computer program code to the communications access point over a data communications connection, wherein the programmable device, when executing the computer program code, causes the access point to operate according to claim 8.

14. A computer system associated with a communications access point and comprising:
  a processor and memory storing computer program code for, when the computer program code is executed by the processor, monitoring a data communications network to identify outages of resources associated with network addresses by:
  recording access attempts to network addresses for which successful access attempts made by user terminals through the access point over the data communications network have been recorded in a predetermined period;
  generating test attempt requests;
  transmitting the test attempt requests from the access point to a plurality of target network addresses, the target network addresses being addresses for which successful access attempts made by user terminals were recorded; and reporting any such network addresses that fail to respond to a network management system.

15. A non-transitory computer-readable storage medium storing a computer program element comprising computer program code to, when loaded into a computer system associated with a communications access point and executed thereon, cause the communications access point to perform the method as claimed in claim 1.

* * * * *